United States Patent [19]
Yamaguchi et al.

[11] Patent Number: 5,107,947
[45] Date of Patent: Apr. 28, 1992

[54] AUTOMATIC CAR-SPEED CONTROLLER

[75] Inventors: Yuichi Yamaguchi; Toshio Iwaoka; Akihiko Tsukahara; Tsutomu Danzaki, all of Yokohama, Japan

[73] Assignee: Jidosha Denki Kogyo K.K., Kanagawa, Japan

[21] Appl. No.: 489,294

[22] Filed: Mar. 5, 1990

[30] Foreign Application Priority Data

Mar. 6, 1989 [JP] Japan .................................. 1-53183

[51] Int. Cl.$^5$ .............................................. B60K 31/08
[52] U.S. Cl. ................................ 180/177; 123/396; 180/170; 364/431.11
[58] Field of Search ................... 364/431.11; 123/352, 123/396; 180/170, 177, 179

[56] References Cited

U.S. PATENT DOCUMENTS

| 4,345,663 | 8/1982 | Shields | 180/179 |
| 4,522,280 | 6/1985 | Blaney | 180/179 |
| 4,747,460 | 5/1988 | Tomoshige et al. | 180/176 |
| 4,855,918 | 8/1989 | Gray | 180/179 |

FOREIGN PATENT DOCUMENTS 59-8023 1/1984 Japan .

Primary Examiner—Andres Kashnikow
Assistant Examiner—Eric Culbreth
Attorney, Agent, or Firm—Sughrue, Mion, Zinn Macpeak & Seas

[57] ABSTRACT

An automatic car-speed controller is provided with a car-speed sensor, a command switch, a car-speed memory, an actuator, a control mechanism, and a holding circuit for cutting off an electric current to the actuator according to a braking operation and maintaining the actuator in its nonworking state till the actuator returns to its working state in response to a cruise command signal from the command switch in addition to the control mechanism. According to this controller, it is possible to release the actuator rapidly from the automatic car-speed controlling state in response to the braking operation even if the trouble occurs in the control mechanism.

1 Claim, 4 Drawing Sheets

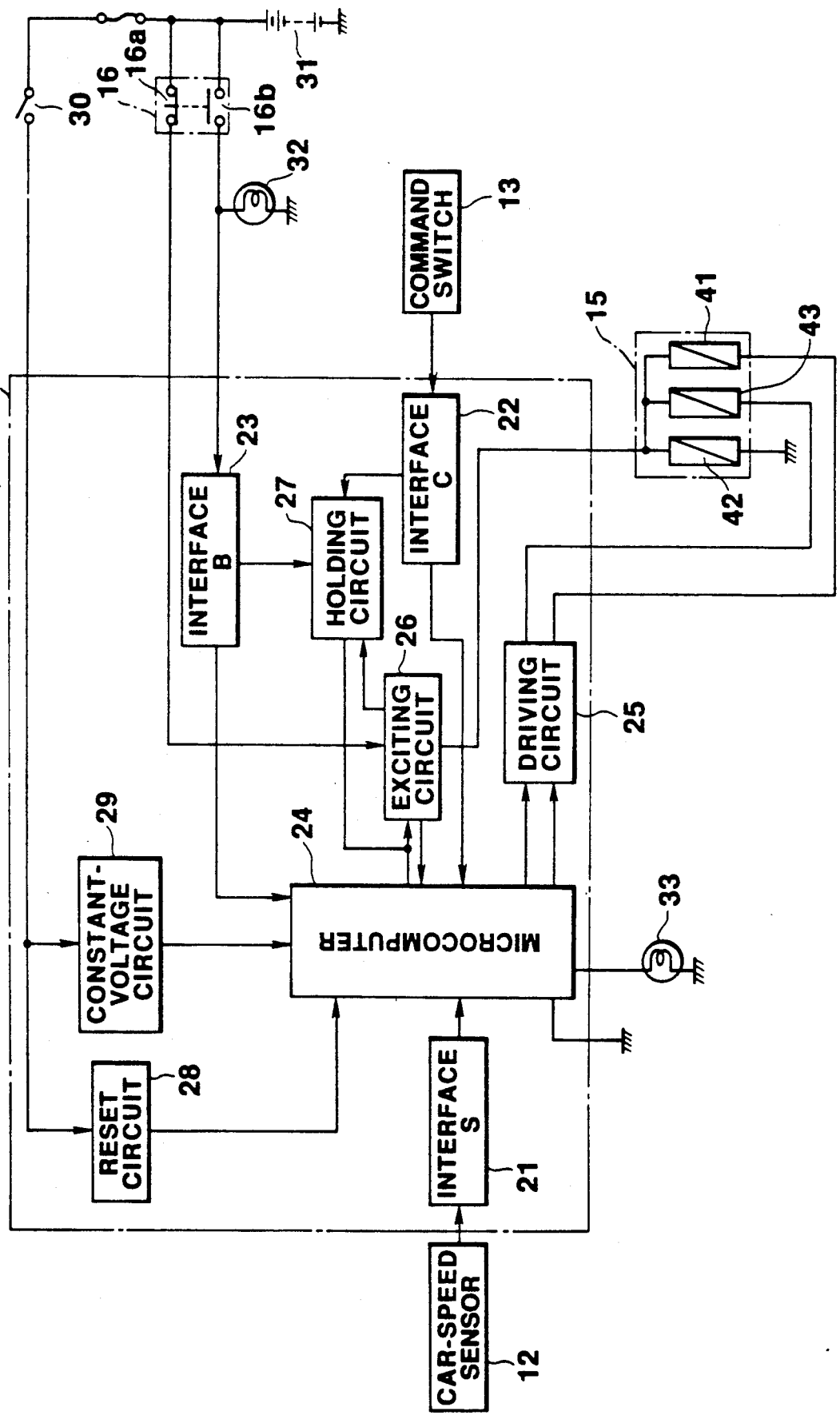

AUTOMATIC CAR-SPEED CONTROLLER

BACKGROUND OF THE INVENTION

1. Field Of The Invention

This invention relates to an automatic car-speed controller used for controlling the traveling speed of a car at a set point automatically.

2. Description Of The Prior Art

Heretofore, there have been many types of such automatic car-speed controllers. Among them, there has been an automatic car-speed controller provided with a car-speed sensor for outputting operating data proportional to an actual car-speed, an actuator for driving a throttle and a command switch for outputting a cruise command signal on outside of a microcomputer, and housed with a car-speed memorizing means for memorizing the operating data of said car-speed sensor in response to an operation of said command switch and a control means for giving a command to said actuator corresponding to a difference between actual car-speed and memorized car-speed in said microcomputer (Japanese Patent Disclosure No. 59-8023/84).

In said automatic car-speed controller, the memorizing means memorizes the car-speed at the time of OFF-operation by setting off the command switch subsequent to the ON-operation, the control means in the microcomputer gives the command to the actuator corresponding to the difference between actual car-speed and memorized car-speed. The throttle is driven according to the working of the actuator and the actual car-speed is controlled to the car-speed so as to travel at a constant traveling speed. Upon operating a brake pedal at the time of traveling at a constant traveling speed, current is cut off to the actuator and simultaneously a cancelling signal given by operating said brake pedal is input to the control means, and said control means cancels the car-speed controlling state, the actuator is changed to the nonworking state by a cancelling command from the control means and the system is cancelled.

However, in the conventional automatic car-speed controller described above, because the control means in the microcomputer makes the actuator into the nonworking state by the cancelling signal according to the operation of the brake pedal in case of cancelling the system by operating said brake pedal, there is the possibility that the car-speed controlling state can not be cancelled even if the current is cut off to the actuator by operating the brake pedal in the case of trouble in the microcomputer. Therefore there is a problem in that the actuator may return to the car-speed controlling state and drive the throttle so as to regulate the speed into the constant traveling speed memorized before the braking operation when the operation of the brake pedal is discontinued subsequent to the braking operation.

SUMMARY OF THE INVENTION

The present invention, made in view of the aforementioned problem of the prior art, has as an object to provide an automatic car-speed controller which can maintain the actuator in the nonworking state by the braking operation even if the microcomputer breaks down.

The construction of the automatic car-speed controller according to this invention will be explained on basis of the functional block diagram shown in FIG. 1. The construction of the automatic car-speed controller for solving the above mentioned problem is characterized by having a car-speed sensor 12 for outputting operating data proportional to an actual car-speed, a command switch 13 for outputting a cruise command signal, a car-speed memorizing means 3 for memorizing the operating data of said car-speed sensor 12 in response to an operation of said command switch 13, an actuator 15 for driving a throttle 14, a control means 6 for giving a command to said actuator 15 corresponding to a difference between actual car-speed and memorized car-speed, and a holding means for cutting off an electric current to said actuator 15 according to a braking operation of a brake switch 16 and for maintaining said actuator 15 in a nonworking state till said actuator 15 becomes into a working state in response to the cruise command from said command switch 13.

In the automatic car-speed controller according to this invention having aforementioned construction, by operating the brake switch 16 during the traveling at the constant traveling speed according to the functioning of the control means 6, the electric current is cut off to the actuator 15, and the holding circuit 27 makes the actuator 15 into a nonworking state by detecting the braking operation of the brake switch 16 independently of the functioning of the control means 6, as shown in FIG. 1. When the braking operation of the brake switch is discontinued, the actuator 15 is maintained in the nonworking state by the holding circuit 27 till the cruise command signal is output in response to the operation of the command switch 13 and the actuator 15 is released from the nonworking state in response to said cruise command signal. Accordingly, the holding circuit maintains the actuator 15 in the nonworking state independently of the control means 6 by the slight operation of the brake switch 16 even if the control means 6 becomes inoperable to cancel the car-speed controlling state owing the abnormality of the microcomputer.

BRIEF DESCRIPTION OF THE DRAWINGS

FIG. 4 is a diagram illustrating the circuitry of another embodiment of the automatic car-speed controller according to this invention.

DESCRIPTION OF THE PREFERRED EMBODIMENTS

This invention will be described below on basis of the drawings.

Embodiment 1

Figure 2:
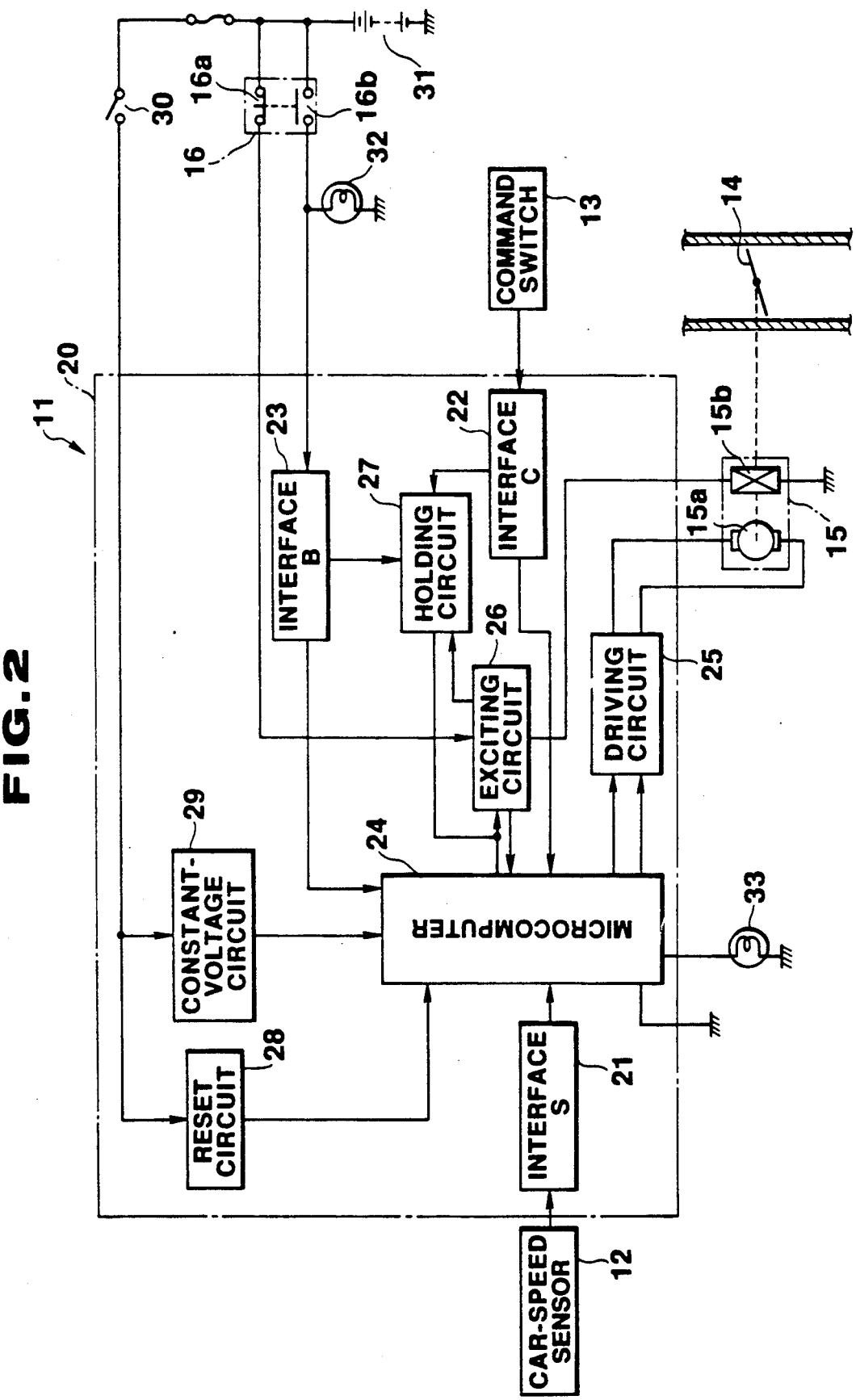
FIG. 2 is a diagram illustrating the circuitry of an embodiment of the automatic car-speed controller according to this invention.
Figure 3:
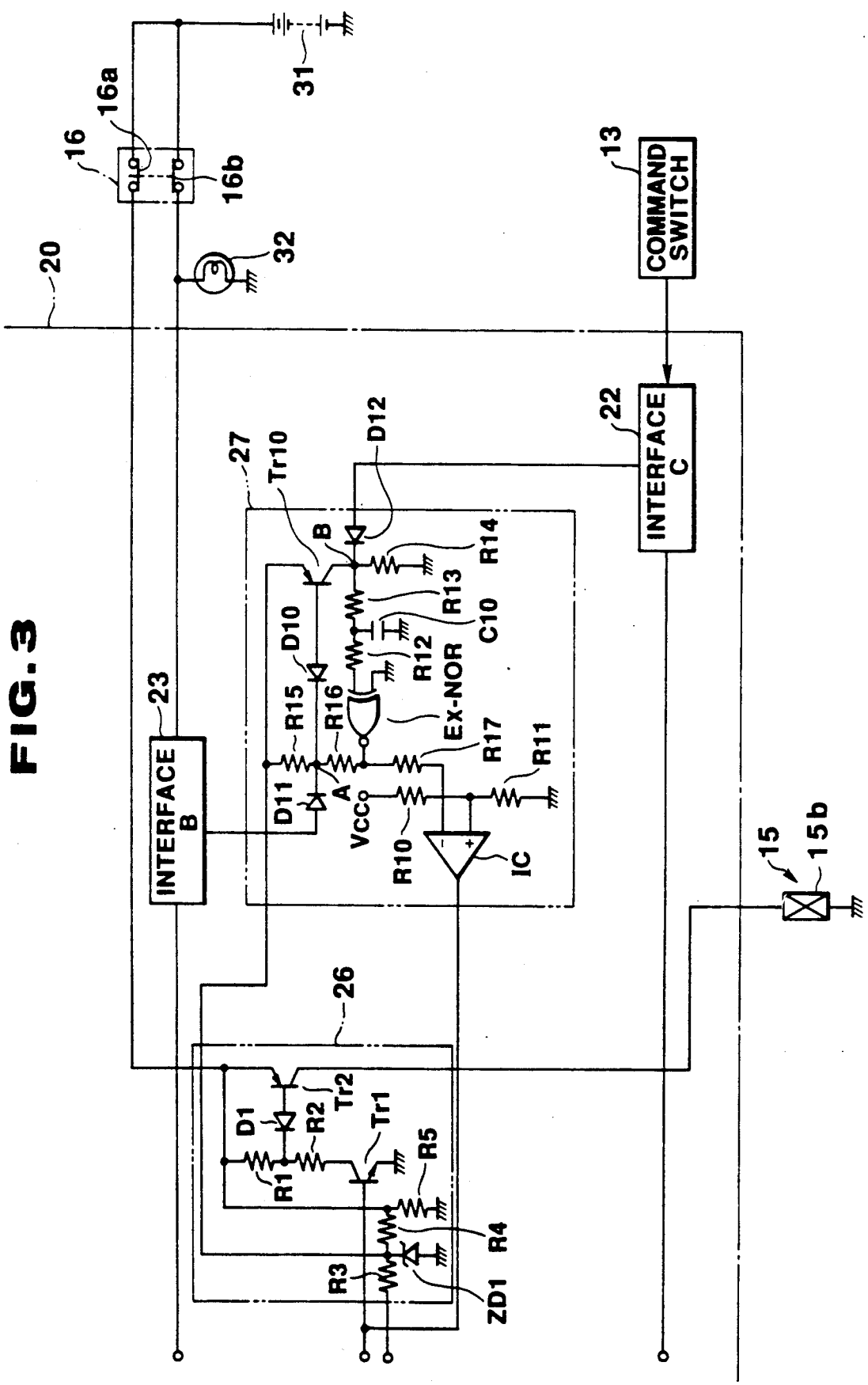
FIG. 3 is a diagram illustrating the circuitry of the exciting circuit and the holding circuit in FIG. 2.

FIG. 2 and FIG. 3 are diagrams showing an embodiment of the automatic car-speed controller according to this invention. FIG. 2 is a diagram illustrating the circuitry of the automatic car-speed controller.

In FIG. 2, numeral 11 is an automatic car-speed controller. Said automatic car-speed controller 11 is provided with a car-speed sensor 12 for outputting operating data proportional to the actual car-speed, a command switch 13 for outputting a cruise command signal, a motor driven actuator 15 for driving a throttle 14 of a motor vehicle, and a brake switch 16 linked to the operation of a brake pedal (not shown) on the outside of a control part 20, and is provided in the control part 20 with a circuit configuration comprising a microcomputer 24 imputted with respective operating data from said car-speed sensor 12, the command switch 13 and the brake switch 16 through respective interface circuits 21, 22 and 23, a driving circuit 25 for driving a driving motor 15a (will be described later) of the actuator 15 in the opening and closing direction of the throttle 14 by said microcomputer 24, an exciting circuit 26 for performing intermission of an electromagnetic clutch 15b (will be described later) of the actuator 15 by said microcomputer 24, a holding circuit 27 for making said exciting circuit 26 into the nonworking state in response to the operation of the brake pedal and maintaining said exciting circuit 26 in the nonworking state till the cruise command signal is output from the command switch 13 when the braking operation of said brake pedal is discontinued, a reset circuit 28 and a constant-voltage circuit 29. The automatic car-speed controller 11 is provided on the outside of said control part 20 with a main switch 30, a battery 31 carried by the vehicle, a brake lamp 32 and a cruise lamp 33.

Said command switch, 13 includes a setting switch,a resuming switch, an accelerating switch and so on.

Said actuator 15 is provided with the driving motor 15a to be driven rotatably in the forward and reverse directions by said driving circuit 25 and the electromagnetic clutch 15b for transmitting the rotation of said driving motor 15a to the throttle 14 through a reduction gear (not shown). The actuator 15 and the throttle 14 are connected through a link rod.

Said brake switch 16 has a normal-closed first switch 16a and a normal-opened second switch 16b, and is so structured that the first switch 16a enters into the opened state by linking with the operation of the brake pedal (not shown) and outputs a cancelling signal to the exciting circuit 26, and the second switch 16b enters into the closed state and outputs a cancelling signal to the microcomputer 24 through the interface circuit 23.

Figure 1:
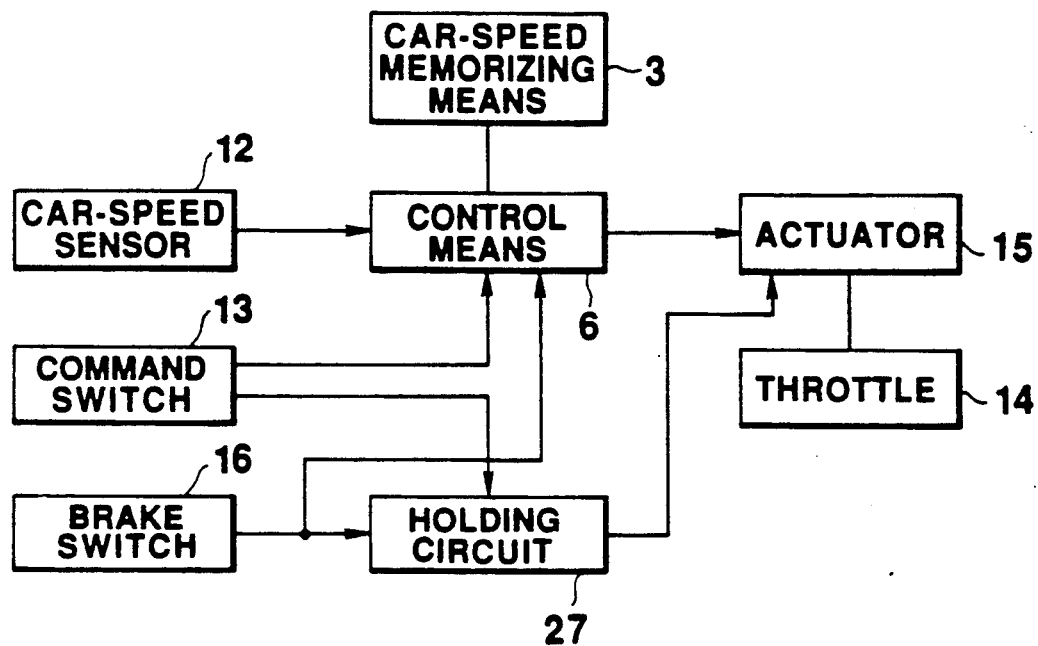
FIG. 1 is a functional block diagram showing the arrangement of an embodiment of the automatic car-speed controller according to this invention.

Said microcomputer 24 houses the car-speed memorizing means 3 of FIG. 1 for memorizing the car-speed at the time of OFF-operation of the setting switch of said command switch 13 subsequent to the ON-operation of said setting switch (which may be designed so as to memorize the car-speed at the time of ON-operation), and the control means 6 of FIG. 1 for comparing the memorized car-speed by said car-speed memorizing means with the actual car-speed from the car-speed sensor 12 and controlling the car-speed so as to accord the actual car-speed with the memorized car-speed by working the driving circuit 25 and the exciting circuit 26 in response to the difference between the car-speeds.

Said exciting circuit 26 is provided, as also shown in FIG. 3, with a npn-type transistor Tr1, a pnp-type transistor Tr2, a diode D1, a zener diode ZD1, resistors R1 and R2 for regulating the base voltage of said transistor Tr2 and the collector voltage of the transistor Tr1, and resistors R3 to R5, and it excites the electromagnetic clutch 15b of the actuator 15 according to a driving command from said microcomputer 24.

Said holding circuit 27 is provided, as also shown in FIG. 3, with a pnp-type transistor Tr10, diodes D10 to D12, a condenser C10, an exclusively NOR circuit Ex-NOR, a comparator IC, resistors R10 and R11 for dividing reference voltage of said comparator IC, resistors R12 to R14 for dividing input voltage of said exclusively NOR circuit, and resistors R15 to R17 for dividing input voltage of said comparator IC, and it changes said exciting circuit 26 into the a nonworking state in response to the braking operation of the brake pedal, maintains the exciting circuit 26 in the nonworking state independently of the working of the microcomputer 24 when the braking operation of the brake pedal is discontinued, and releases said exciting circuit 26 from the unworking state in response to the cruise command signal from the command switch 13.

Next, an explanation is given on the action of the automatic car-speed controller 11 having the above-mentioned configuration.

First of all, the main switch 30 is switched into ON-state in order to operate the automatic car-speed controller 11. Hereupon, the car-speed sensor 12 outputs the pulse signal, that is the operating data proportional to the actual car-speed, to the microcomputer 24 in the control part 20. The pulse signal is sampled for a specified time such that the microcomputer 24 detects the pulse number proportional to the car-speed. In this state, the cruise lamp 33 is lit at the time of cancelling the setting signal subsequent to the input of the setting signal into the control means of the microcomputer 24 by setting the switch of the command switch 13, the pulse number according to the car-speed at that time is memorized by the car-speed memorizing means in the microcomputer 24. The control means in the microcomputer 24 works the exciting circuit 24 and makes the electromagnetic clutch 15b of the actuator 15 into the excited state, so that the throttle 14 is enabled to be opened and closed by the rotation of the driving motor 15a.

In this state, the motor driving signal in response to the pulse number memorized by the car-speed memorizing means is output from the control means of said microcomputer 24, the driving circuit 25 makes the driving motor 15a of the actuator rotate according to said motor driving signal, and so the throttle 14 is maintained in the prescribed position through the electromagnetic clutch 15b and the link rod (not shown). After that, the throttle 14 is maintained in the prescribed position without operating the accelerator pedal, the motor vehicle can travel at a constant traveling speed.

Hereupon, the control means of the microcomputer 24 compares the pulse number proportional to the actual car-speed from the car-speed sensor 12 with the pulse number memorized in the car-speed memorizing means of the microcomputer 24 (memorized car-speed), outputs the motor driving signal in response to the difference between said actual and momorized car-speeds into the driving circuit 25, and rotates the driving motor 15a of the actuator 15 in order to maintain the car-speed constantly.

In the case of cancelling the automatic car-speed control described above, by operating the brake pedal, the first switch 16a of the brake switch 16 linking with the braking operation becomes into OFF-state (which is normally in ON-state) and the second switch 16b of the brake switch 16 becomes into ON-state (which is normally in OFF-state).

Thereby, the power supply to the exciting circuit 26 is cut off according to the OFF-state of the first switch 16a of the brake switch 16, the cancelling signal is input to the microcomputer 24 through the interface circuit 23 and is also input to the holding circuit 27 through the same interface circuit 23 in response to the ON-state of the second switch 16b of said brake switch 16.

Namely, when the cancelling signal is input to the holding circuit 27 through the diode D11, the signal level at point A becomes "HIGH" and the base of the transistor Tr 10 loses the conductivity. Therefore, the input signals of the exclusively NOR circuit Ex-NOR become into "LOW" level ("0") equally and the output signal becomes into "HIGH" level ("1"). Because the input level of the ⊖ terminal exceeds the input level of the ⊕ terminal of the comparator IC, the output signal of the comparator IC becomes into "LOW" level ("0"), the base potential of the transistor Tr 1 of the exciting circuit 26 becomes into "LOW" level and the base of the transistor Tr2 also loses the conductivity, the electromagnetic clutch 15b of the actuator 15 becomes into the unexcited state.

When the braking operation of the brake pedal is discontinued, the first switch 16a of the brake switch 16 returns to the ON-state and the exciting circuit 26 is supplied with electric power. However, because the output signal of the exclusively NOR circuit Ex-NOR maintains the "HIGH" level and the signal level at point A remains in the "HIGH" level, the base of the transistor Tr 10 can not gain the conductivity and the transistor Tr2 of the exciting circuit 26 is maintained in the nonworking state.

Therefore, it is possible that the holding circuit 27 maintains the electromagnetic clutch 15b of the actuator 15 in the unexcited state according to the detection of the braking operation of the brake pedal even when the control means in the microcomputer 24 can not cancel the car-speed controlling state owing to the abnormality of the microcomputer 24 caused by an overcurrent or the like.

In case of returning the system to the automatic car-speed control, by operating the resuming switch of the command switch 13, the cruise command signal from said command switch 13 is input to the microcomputer 24 through the interface circuit 22 and is also input to the holding circuit 27 through the same interface circuit 22.

Namely, the signal level at point B becomes "HIGH" through the diode D12 in the holding circuit 27, the cruise signal is input to the exclusively NOR circuit Ex-NOR and an input signal an one side becomes into "HIGH" level. Thereby, the level of the inputs of the exclusively NOR circuit Ex-NOR becomes discordant and the output level becomes into "LOW" level. Therefore, it is possible to change the base potential level of the transistor Tr1 in the exciting circuit 26 according to the command from the microcomputer 24 since the output signal of the comparator IC becomes into "HIGH" by the difference of the level of the inputs.

Embodiment 2

Figure 5:
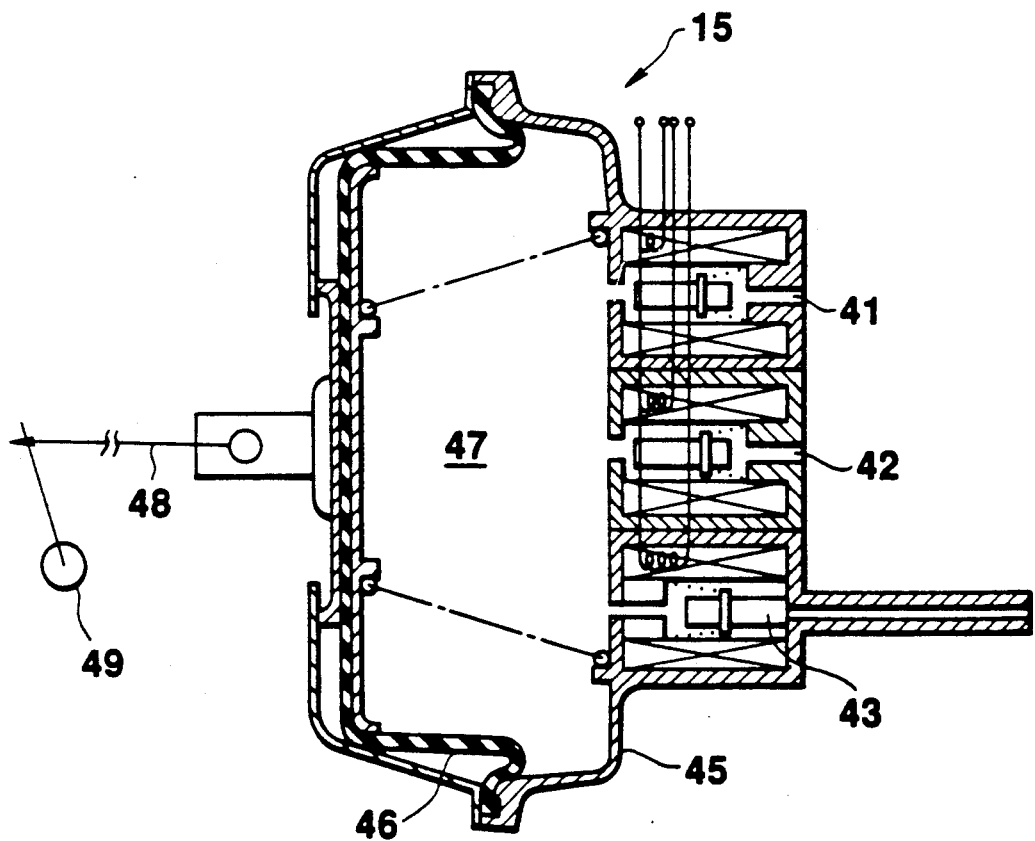
FIG. 5 is a sectional view illustrating the structure of the actuator shown in FIG. 4.

FIG. 4 and FIG. 5 are diagrams showing another embodiment of the automatic car-speed controller according to this invention. FIG. 4 is a diagram illustrating the circuitry of the automatic car-speed controller.

In FIG. 4, the actuator 15 (corresponding to the actuator 1 shown in FIG. 1) of the automatic car-speed controller 11 is an actuator of a negative-pressure driven type, and is provided with a vent valve 41, a safety valve 42 and a vacuum valve 42 as shown also in FIG. 5. Each of one end of the vent valve 41 and the safety valve 42 is open to the air and one end of the vacuum valve 43 is connected to an intake manifold (negative pressure source). Opposite ends of the respective valves 41, 42 and 43 communicate with a negative pressure cavity 47 formed with a casing 45 and one side (right side in FIG. 5) of a diaphragm 46, another side (left side in FIG. 5) of the diaphragm 46 is connected with one end of a control wire 48 and the opposite end of the control wire 48 is connected to a throttle shaft 49.

Upon changing the exciting circuit 26 into the nonworking state by the braking operation of the brake pedal, the vent valve 41 and the safty valve 42 are opened and the air is introduced into the negative pressure cavity 47 because of cutting off the power supply to the vent valve, 41, the safety valve 42 and the vacuum valve 43 of the actuator 15, so that the actuator 15 may be changed into the nonworking state.

When the holding circuit 27 makes the exciting circuit 26 into the nonworking state by the braking operation of the brake pedal, the actuator 15 becomes into the nonworking state in the same manner as the aforementioned explanation and the holding circuit 27 maintains the actuator 15 in the nonworking state similarly to the aforementioned embodiment 1 even if the braking operation of the brake pedal is discontinued.

Additionally, in respective embodiments 1 and 2, the actuator 15 has been described as the motor driven type and the negative-pressure driven type, however it is clearly intended that an actuator of a negative-pressure pump type or a positive-pressure driven type could also be used within the technical scope of this invention.

As mentioned above, the automatic car-speed controller according to this invention has a car-speed sensor for outputting operating data proportional to an actual car-speed, a command switch for outputting a cruise command signal, a car-speed memorizing means for memorizing the operating data of said car-speed sensor in response to an operation of said command switch, an actuator for driving a throttle, a control means for giving a command to said actuator corresponding to a difference between actual car-speed and memorized car-speed, and a holding means for cutting off an electric current to said actuator according to a braking operation and for maintaining said actuator in a nonworking state till said actuator becomes into a working state in response to the cruise command signal from said command switch. Therefore, because the holding means makes the actuator into the nonworking state by detecting the braking operation and maintains the actuator in the nonworking state independently of the control means even when the braking operation is discontinued, an excellent effect is obtained in that it is possible to cancel the actuator very rapidly in response to the braking operation even if the trouble or the response time lag occurs in the control means.

What is claimed is:

1. An automatic car-speed controller comprising:
    a car-speed sensor for outputting data proportional to an actual car-speed;
    a command switch for outputting a cruise command signal;
    a car-speed memorizing means for memorizing the operating data of said car-speed sensor in response to an operation of said command switch;
    an actuator for driving a throttle;
    a control means for giving a command to said actuator corresponding to a difference between actual car-speed and memorized car-speed and for canceling automatic car-speed control according to a canceling signal output in response to a braking operation and maintaining said actuator in a nonworking state until the cruise command signal is output from the command switch; and holding circuit means, coupled to receive an output of said command switch, for cutting off an electric current to said actuator according to a braking operation and for maintaining said actuator in the nonworking state till said actuator returns to a working state in response to the cruise command signal from said command switch in addition to said control means.

* * * * *